US005952780A

United States Patent [19]

Forsdyke et al.

[11] Patent Number: 5,952,780

[45] Date of Patent: Sep. 14, 1999

[54] AMALGAM FOR USE IN FLUORESCENT LAMPS COMPRISING LEAD, TIN, MERCURY TOGETHER WITH ANOTHER OF THE GROUP SILVER, MAGNESIUM, COPPER, NICKEL, GOLD AND PLATINUM.

[75] Inventors: Graham Malcolm Forsdyke; Stuart Albert Mucklejohn, both of Leicestershire; Alan Thomas Dinsdale, Middlesex, all of United Kingdom

[73] Assignee: General Electric Company, Schenectady, N.Y.

[21] Appl. No.: 08/849,426

[22] PCT Filed: Oct. 4, 1996

[86] PCT No.: PCT/GB96/02435

§ 371 Date: Sep. 25, 1997

§ 102(e) Date: Sep. 25, 1997

[87] PCT Pub. No.: WO97/13000

PCT Pub. Date: Apr. 10, 1997

[30] Foreign Application Priority Data

Oct. 5, 1995 [GB] United Kingdom ................ 95 203 67

[51] Int. Cl.[6] ............................ A01J 17/26; H01J 01/62; H01J 63/04

[52] U.S. Cl. .......................... 313/565; 313/490; 313/563; 313/564

[58] Field of Search ....................... 313/490–93, 545–51, 313/634–39, 563–66

[56] References Cited

U.S. PATENT DOCUMENTS 4,093,889 6/1978 Bloem et al. .

FOREIGN PATENT DOCUMENTS 1176955 1/1970 United Kingdom .

OTHER PUBLICATIONS

Scr. Fac. Sci. Nat. Univ. Purkyniane Brun., Dep. Anal. Chem., J.E. Purkyne Univ., Brno, Czeck, vol. 3, No. 8, 1973, pp. 55–57, XP002020225, Jambor, J.: "Determination of mercury by atomic absorption spectroscopy".

Patent Abstracts of Japan vol. 008, No. 261 (E–281), Nov. 30, 1984 & JP,A,59 132555 (Toshiba KK), Jul. 30, 1984, see abstract.

Patent Abstracts of Japan vol. 07, No. 115 (E–176), May 19, 1983 & JP,A,58 034555 (Tokyo Shibaura Denki KK), Mar. 1, 1983, see abstract.

Patent Abstracts of Japan vol. 013, No. 274 (M–841), Jun. 23, 1989 & JP,A,01 071594 (Furukawa Electric Co Ltd:The;Others: 01), Mar. 16, 1989, see Table 1 in patent document, examples 9,11,13,15 and 16, see abstract.

*Primary Examiner*—Sandra O'Shea

*Assistant Examiner*—Mack Haynes

*Attorney, Agent, or Firm*—Pearne, Gordon, McCoy & Granger LLP

[57] ABSTRACT

An amalgam for a fluorescent lamp. The amalgam includes mercury, tin, lead, and another metal selected from the group consisting of silver, magnesium, copper, gold, platinum, and nickel.

6 Claims, 1 Drawing Sheet

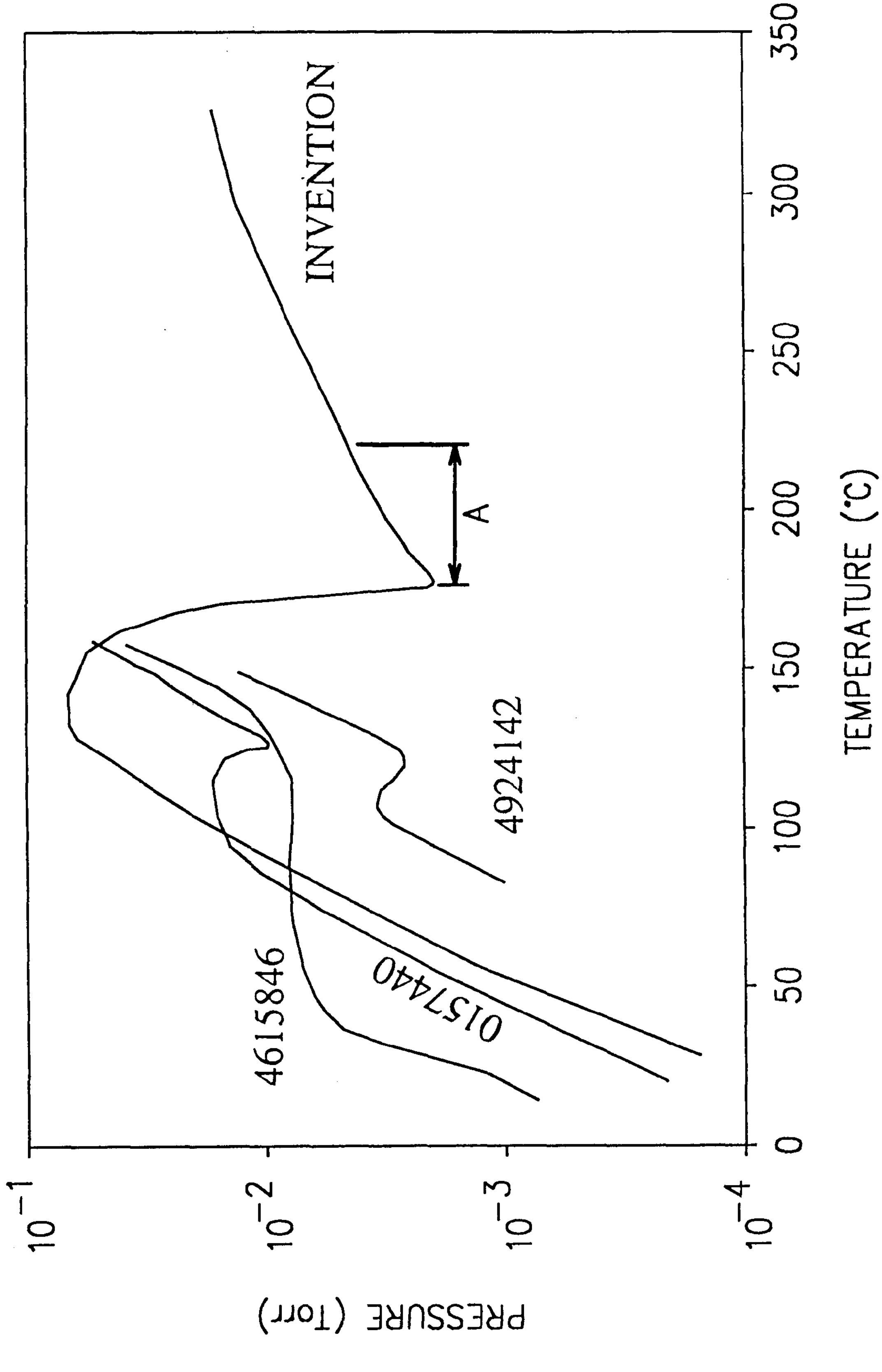
INVENTION
A
4924142
4615846
0157440
TEMPERATURE (°C)
0
50
100
150
200
250
300
350
PRESSURE (Torr)
$10^{-1}$
$10^{-2}$
$10^{-3}$
$10^{-4}$

AMALGAM FOR USE IN FLUORESCENT LAMPS COMPRISING LEAD, TIN, MERCURY TOGETHER WITH ANOTHER OF THE GROUP SILVER, MAGNESIUM, COPPER, NICKEL, GOLD AND PLATINUM.

BACKGROUND OF THE INVENTION

The present invention relates to amalgams for use in fluorescent lamps and other devices which require amalgams.

As discussed in "Amalgams for Fluorescent Lamps" by J. Bloem et al Philips Technical Review 38, P 3–88 1978/79 No. 3, the luminous flux of a fluorescent lamp (low-pressure mercury type) depends to a considerable extent on the mercury-vapour pressure present in the tube. The pressure is determined by the temperature of the coolest part of the tube, which is usually the wall. The maximum luminous flux is reached when the wall temperature is 40° C. which for many fluorescent lamps corresponds to an ambient temperature of 25° C. The wall temperature of lamps in closed luminaires or special lamps can be very much higher. In such conditions a high luminous flux can still be attained by using a suitable amalgam in place of pure mercury. This has the effect of lowering the mercury pressure and also of keeping it more or less stable over a broad temperature range. Bloem et al disclose various amalgams containing mercury and one or more of the metals Pb, Sn, Bi, In, Cd, Ga and Ti and state that of amalgams with three or four metals Bi—Pb—Sn—Hg seemed to be the most promising. Bloem et al discuss $Bi_{0.53}$ $In_{0.47}$ with 6 atomic percent Hg and $Bi_{0.47}$ $Pb_{0.29}$ $Sn_{0.24}$ with 6 atomic percent Hg, which gave the best results. These amalgams give good stable luminous flux at higher than ambient temperature without the mercury-vapour pressure being too low at ambient temperature thus allowing the lamp to reach its maximum luminous flux.

For a better understanding of the prior art and of the invention reference will be made in the following discussion to the accompanying drawings which shows pressure temperature curves of various amalgams.

U.S. Pat. No. 4,924,142 discloses an amalgam comprising Hg, In, Sn and Zn, wherein the ratio between the atoms of In and Sn is between 3:1 and 8:1; the ratio between the sum of the atoms of In and Sn and the atoms of Zn is between 95:5 and 99:1; and the ratio between the sum of the atoms of In, Sn and Zn and the atoms of Hg is between 95:5 and 99:1. U.S. Pat. No. 4,924,142 discloses an example of the amalgam in which the atomic ratio of the elements In: Sn: Zn is 82.5: 16:1.5, with 2 atomic percent Hg. The temperature pressure curve of such an amalgam is shown by curve 4924142 in the accompanying drawing. The curve shows that the temperature interval of the operating range of the amalgam (the plateau) is between 105° C. and 130° C. where the plateau pressure is about $3\times10^{-3}$ Torr.

U.S. Pat. No. 4,615,846 discloses an amalgam consisting of 15 to 57 wt % Sn, 5 to 40 wt % Pb, 30 to 70 wt % Bi, 4 to 50 wt % In and 4 to 25 wt % Hg. The temperature pressure curve of such an amalgam is shown by curve 4615846 in the accompanying drawing. The curve shows that within the temperature range 50° to 130° C. the mercury vapour pressure is held at $6\times10^{-3}$ to $7\times10^{-3}$ mm Hg (Torr).

EP-B1-0,157,440 discloses an amalgam of Hg and an alloy wherein the alloy is composed of bismuth, lead and silver whereby the mutual ratio of the numbers of atoms of bismuth, lead and silver lies in the quadrangle ABCD of the ternary diagram Bi—Pb—Ag with A:93% of Bi, 2% of Pb, 5 of Ag;

B:35% of Bi, 60% of Pb, 5% of Ag;

C:35% of Bi, 35% of Pb, 30% of Ag;

D:68% of Bi, 2% of Pb, 30% of Ag (atomic %), and that the ratio of the sum of the number of atoms of bismuth, lead and silver to the number of atoms of mercury lies between 94:6 and 99:1.

Curve 0157440 on the accompanying drawing shows the pressure temperature curve of such an amalgam where the atom ratio of Bi:Pb:Ag:Hg=53:24:20:3. At about 110° C. the mercury vapour pressure is about 1.5 Pa ($11\times10^{-3}$ mm Hg).

This allows good light output at high temperature, the pressure of 1.5 Pa being maintainable over a range of temperatures as indicated by the plateau about 110° C.

SUMMARY OF THE INVENTION

In accordance with the present invention, an amalgam is provided including 0.001 to 0.005 mole fraction of mercury, 0.24 to 0.48 mole fraction of lead, 0.45 to 0.73 mole fraction of tin, and 0.01 to 0.15 mole fraction of other metal selected from the group consisting of silver, magnesium, copper, gold, platinum, and nickel. Also provided in accordance with the present invention is a fluorescent lamp that includes the foregoing amalgam.

BRIEF DESCRIPTION OF THE DRAWING

The features, aspects, and advantages of the present invention will become better understood with regard to the following description, appended claims, and accompanying drawing, which shows a graph of temperature versus pressure for several prior art amalgams, as well as the inventive amalgam.

DETAILED DESCRIPTION OF THE PREFERRED EMBODIMENTS

According to the present invention, there is provided the following amalgams:

Silver+Lead+Tin+Mercury

Magnesium+Lead+Tin+Mercury

Copper+Lead+Tin+Mercury

Gold+Lead+Tin+Mercury

Platinum+Lead+Tin+Mercury

Nickel+Lead+Tin+Mercury

It is expected that any metal which is added to the system (Lead+Tin+Mercury) which shows:

Intermetallic compound formation with Tin and

Binary eutectic formation at high Lead contents would have a region of stability as described below and therefore be suitable for use as an amalgam system for use in fluorescent lamps.

It has been found that these amalgam systems work above 130° C.

Furthermore, a surprising property of such systems, not hitherto expected, is a region of slowly changing vapour pressure with temperature which can be utilised to give optimum mercury vapour pressure for a fluorescent lamp at a high temperature.

Over a restricted composition range of the parent alloy, e.g. Silver+Lead+Tin, amalgams with low mercury content (typically 0.2 mole percent) exhibit a small change in mercury partial pressure over a large temperature range. In the currently preferred example below the partial pressure of mercury varies by approximately 1.4 Pa over the range 180° to 280° C. This characteristic renders these amalgam systems extremely attractive for fluorescent lamps with high cool spot temperatures.

The systems according to the invention and described above differ from those commonly used and those reported in the literature in that there is a greater temperature range over which vapour pressure changes slowly with temperature. In the inventive systems above, this temperature range covers approximately 100° C. and in commonly used systems it covers approximately 40° to 70° C. The latter systems are also restricted to a maximum temperature of 150° C.

Preferred amalgams in accordance with the invention include those having the following composition in mole fractions:

| | |
|---|---|
| mercury | 0.001 to 0.005 |
| lead | 0.24 to 0.48 |
| tin | 0.45 to 0.73 |

and the other metal 0.01 to 0.15, the other metal comprising silver, magnesium, copper, gold, platinum or nickel.

A presently preferred embodiment of the invention comprises $Pb_{0.47}$ $Sn_{0.47}$ $Ag_{0.06}$ with 0.2 atomic percent Hg where the proportions of the elements are in mole fractions. Such an amalgam has the characteristic of partial mercury pressure versus temperature as shown by the curve denoted INVENTION in the drawing. This characteristic is surprising and not hitherto expected. It has a region A in which the mercury vapour pressure varies by a relatively small amount e.g. about $3\times10^{-3}$ Torr between about 180° C. and 230° C., i.e. over a temperature range of about 50° C. The mercury vapour pressure also varies by a similar amount over the next temperature range of about 50° C. (i.e. up to about 280° C.), thus providing a wide temperature range (about 100° C.) with only a relatively small change in vapour pressure.

The temperatures in the region A of small change are considerably higher than the corresponding regions of the prior art.

The relatively elevated temperatures of the range A of slow change allows greater freedom in the design of fluorescent lamps, especially Electrodeless Fluorescent Lamps.

Other amalgams according to the invention include:

$Pb_{0.48}$ $Sn_{0.48}$ $Ag_{0.04}$ with 0.1 atomic percent Hg $Pb_{0.24}$ $Sn_{0.74}$ $Ag_{0.02}$ with 0.1 atomic percent Hg all of which have a pressure/temperature characteristic like (but not identical to) that shown in the drawings by the curve INVENTION.

What is claimed is:

1. An amalgam comprising:

| | |
|---|---|
| mercury | 0.001 to 0.005 mole fraction |
| lead | 0.24 to 0.48 mole fraction |
| tin | 0.45 to 0.73 mole fraction |
| other metal | 0.01 to 0.15 mole fraction |

wherein said other metal is selected from the group consisting of silver, magnesium, copper, gold, platinum, and nickel.

2. An amalgam comprising, in mole fractions $Pb_{0.47}$ $Sn_{0.47}$ $Ag_{0.06}$ with 0.2 atomic percent Hg.

3. An amalgam comprising, in mole fractions $Pb_{0.48}$ $Sn_{0.48}$ $Ag_{0.04}$ with 0.1 atomic percent Hg.

4. An amalgam comprising in mole fractions $Pb_{0.24}$ $Sn_{0.74}$ $Ag_{0.02}$ with 0.1 atomic percent Hg.

5. A fluorescent lamp including an amalgam, said amalgam comprising:

| | |
|---|---|
| mercury | 0.001 to 0.005 mole fraction |
| lead | 0.24 to 0.48 mole fraction |
| tin | 0.45 to 0.73 mole fraction |
| other metal | 0.01 to 0.15 mole fraction |

wherein said other metal is selected from the group consisting of silver, magnesium, copper, gold, platinum and nickel.

6. A lamp according to claim 5 which is an electrodeless fluorescent lamp.

* * * * *